United States Patent [19]

Oshima et al.

[11] Patent Number: 5,005,626

[45] Date of Patent: * Apr. 9, 1991

[54] PNEUMATIC RADIAL TIRE HAVING A FOLDED BELT INCLUDING A POLYVINYL ALCOHOL CORDS

[75] Inventors: Kazuo Oshima, Higashiyamato; Shizuo Iwasaki, Kodaira, both of Japan

[73] Assignee: Bridgestone Corp., Tokyo, Japan

[*] Notice: The portion of the term of this patent subsequent to Dec. 26, 2006 has been disclaimed.

[21] Appl. No.: 133,405

[22] Filed: Dec. 15, 1987

[30] Foreign Application Priority Data

Dec. 19, 1986 [JP] Japan .................................. 61-305470

[51] Int. Cl.⁵ .......................... B60C 9/26; B60C 15/00
[52] U.S. Cl. .................................... 152/527; 152/528; 152/536; 152/541; 152/554
[58] Field of Search ............... 152/527, 526, 528, 529, 152/531, 534, 535, 541, 554, 555

[56] References Cited

U.S. PATENT DOCUMENTS

| | | | |
|---|---|---|---|
| 3,612,138 | 10/1971 | Ravenhall | 152/555 X |
| 3,826,298 | 7/1974 | Tanaka et al. | 152/527 |
| 3,831,656 | 8/1974 | Senger et al. | 152/529 |
| 3,851,693 | 12/1974 | Takemura et al. | 152/527 |
| 3,854,515 | 12/1974 | Takemura et al. | 152/527 |
| 3,874,436 | 4/1975 | Hashida et al. | 152/535 X |
| 3,961,657 | 6/1976 | Chrobak | 152/554 X |
| 4,170,255 | 10/1979 | Greiner et al. | 152/529 X |
| 4,603,083 | 7/1986 | Tanaka et al. | 264/210.8 X |
| 4,627,479 | 12/1986 | Shurman et al. | 152/541 |

OTHER PUBLICATIONS

Samuel K. Clark, ed., "Mechanics of Pneumatic Tire", National Bureau of Standard Monograph 122, Nov. 1971, pp. 355–369.

*Primary Examiner*—Caleb Weston
*Assistant Examiner*—Geoffrey L. Knable
*Attorney, Agent, or Firm*—Sughrue, Mion, Zinn, Macpeak & Seas

[57] ABSTRACT

A pneumatic radial tire having a low noise and an improved cornering stability has a belt structure of at least two belt layers composed of at least one layer containing cords each obtained by twisting organic fibers and at least one layer containing steel cords, at least one of the organic fiber cord layers being interposed between the steel cord layer and a tread at a state that both transversely outermost end portions are folded inward. This organic fiber cord is a cord obtained by twisting high strength, high modulus polyvinyl alcohol fibers and has particular twisting coefficient and strength. The tire further satisfies a particular relation between a height of a turnup portion of a carcass ply around a bead portion and a tensile stress at 50% elongation of a bead filler rubber reinforcing the bead portion at room temperature.

4 Claims, 2 Drawing Sheets

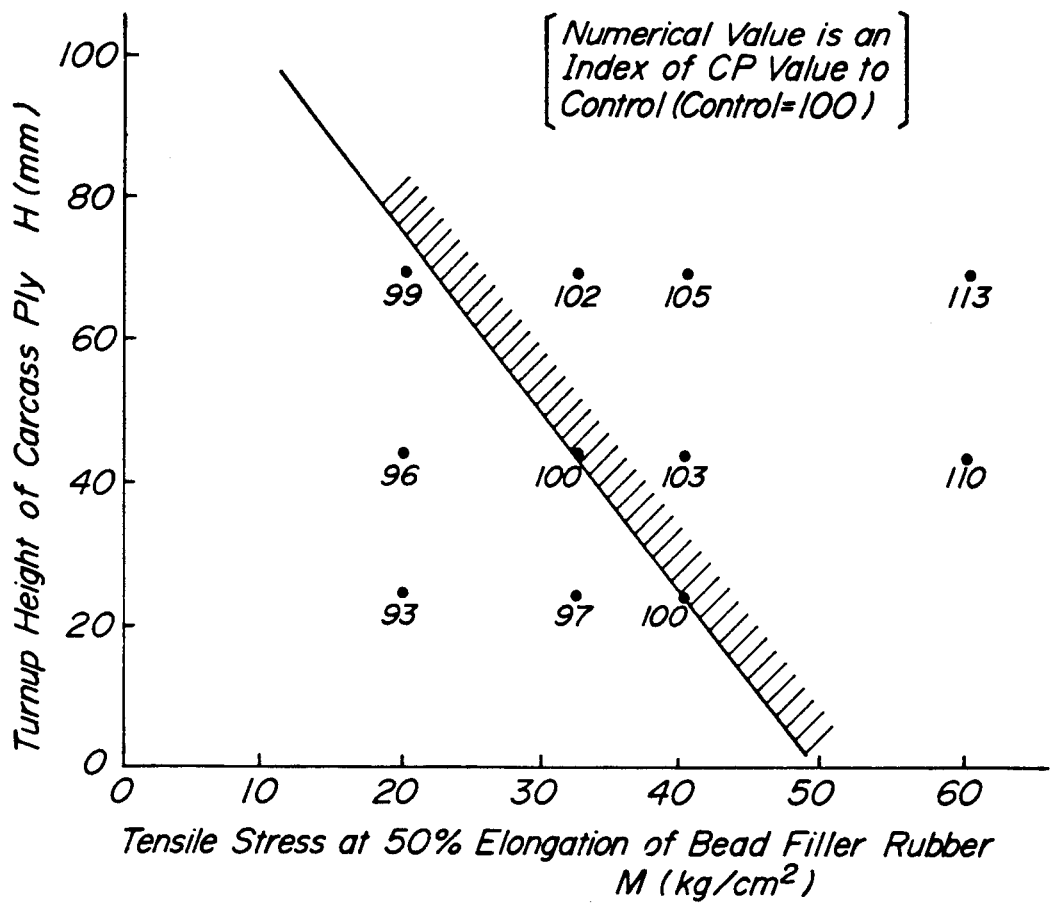
FIG_2

PNEUMATIC RADIAL TIRE HAVING A FOLDED BELT INCLUDING A POLYVINYL ALCOHOL CORDS

BACKGROUND OF THE INVENTION

1. Field of the Invention

This invention relates to a so-called low noise radial tire having an improved cornering stability which can largely reduce noise level without damaging the cornering stability of the tire and the braking performance on a wet road surface.

2. Related Art Statement

Recently, noise generated from automobiles has become a great social problem and particularly, automobile noise becomes regulated by a law, so that it is urgently needed to reduce the noise level. On the other hand, it is required to ensure a low noise level inside the automobile from a viewpoint of the enhancement in the automobile riding environment. In any case, the demand on the reduction of noise becomes indispensable.

Heretofore, it has been said that the noise of the radial tire is effectively reduced by the improvement of tread pattern, unharmonization of pattern pitch or the like. However, such a change of the tread pattern largely affects the braking performances on wet road surface and the like, so that the freedom degree of such a change is very small in view of the safety and is greatly restricted.

Therefore, it is desired to establish a technique capable of reducing the noise without changing the tread pattern but effective countermeasures have not yet been found.

The inventors have made various studies in order to obtain low noise tires and considered to require an approach different from the conventional technique because there was observed the conflicting phenomenon that the braking performance on a wet road surface is reduced by changing the tread pattern as previously mentioned. Consequently, the inventors have made various attempts on the design factors of various tires, but the reduction of noise level was about 1 decibel at most by these attempts.

On the other hand, the inventors noticed that the noise is reduced by about 0.3 decibel in the conventional tire of aramid fold belt structure consisting of a combination of steel cord layer and folded aramid fiber cord layer. The inventors made further studies with respect to this belt structure and found that the noise can largely be reduced by interposing an organic fiber cord layer having given properties between steel cord layer and tread rubber, which has been filed as U.S. patent application Ser. No. 927,016.

In this case, however, the belt layer of organic fiber cord other than aramid fiber cord is used instead of the steel cord belt layer, so that there is no great difference in the feeling of actual running performances, but it is frequently evaluated that the tire rigidity, particularly limit cornering property due to the shortage of belt rigidity, the steering property of handle and the like are still poor. As a result, it is considered that such a tire is necessary to be further improved.

SUMMARY OF THE INVENTION

It is, therefore, an object of the invention to provide a pneumatic radial tire having a more improved total cornering stability which can largely enhance the tire rigidity with maintaining the advantages of the aforementioned low noise tire.

The inventors have made various examinations in order to further increase the rigidity of the previously proposed low noise tire and have found that the above object can be achieved by replacing the belt layer of the organic fiber cord used in the radial tire with a belt layer of cords obtained by twisting polyvinyl alcohol fibers with given high strength and high modulus of elasticity and further improving the bead portion, and as a result, the invention has been accomplished.

According to the invention, there is the provision of a pneumatic radial tire having a belt structure of at least two belt layers composed of at least one layer containing cords each obtained by twisting organic fibers and at least one layer containing steel cords, at least one of the organic fiber cord layers being interposed between the steel cord layer and a tread at such a state that both transversely outermost end portions are folded inward, said organic fiber cord being a cord obtained by twisting high strength, high modulus polyvinyl alcohol fibers and having, after being taken out from the tire, a twisting coefficient $N_T$ represented by the following equation:

$$N_T = N \times \sqrt{0.139 \times D/\rho} \times 10^{-3}$$

, wherein N is a twisting number per 10 cm of cord length, D is ½ of total denier number of cord and $\rho$ is a specific gravity of cord and a strength S (g/d), which satisfy the following relations:

$$0.19 < N_T < 0.55 \quad (1)$$

$$S > 15.5 - 12N_T \quad (2)$$

, and said tire satisfying the following relation:

$$H > -2.5M + 125 \quad (3)$$

wherein H is a height of a turnup portion of a carcass ply around a bead portion (mm) and M is a tensile stress at 50% elongation of a bead filler rubber reinforcing the bead portion at room temperature (kg/cm²).

BRIEF DESCRIPTION OF THE DRAWINGS

FIG. 2 is a graph showing a relation between tensile stress M at 50% elongation of bead filler rubber and turnup height H of carcass ply.

DESCRIPTION OF THE PREFERRED EMBODIMENTS

Figure 1:
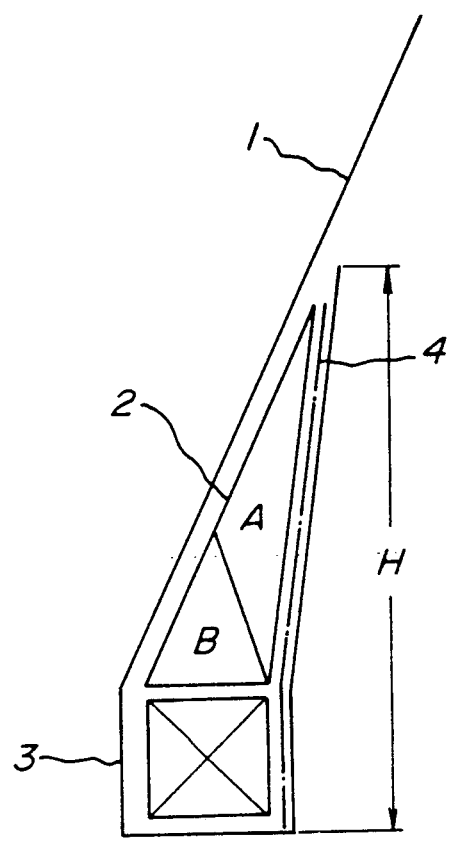
FIG. 1 is a partially schematical section view of an embodiment of the radial tire at bead portion according to the invention.

According to the invention, as shown in FIG. 1, a bead filler rubber 2 may be composed of at least two rubbers having different tensile stresses M at 50% elongation, for example, rubbers A and B. In this case, the tensile stress M at arithmetic mean of tensile stresses M of these rubbers and volume thereof is required to satisfy the above equation (3).

In general, as the rigidity of the belt reduces, the cornering stability of the tire lowers and particularly, it is obliged to reduce the limit cornering property and the steering property of handle at high speed running. In the low noise tire as in the invention, the organic fiber cords having a rigidity lower than that of steel cord are used in a part of the belt layers instead of the steel cord layer, so that it is obvious to lower the belt rigidity. For this end, in order to ensure the cornering performances as far as possible, it is necessary that the reduction of belt rigidity is restrained by folding at least one of the organic fiber cord layers at both transversely outermost end portions thereof. In the latter case, though there is no great difference in the cornering stability and actual feeling performances as compared with the conventional belt composed of two steel cord layers, the limit cornering property, steering property handling at high speed running and so on are still poor. Now, the rigidity of the bead portion is increased to compensate for such a reduction of the belt rigidity, whereby the cornering stability is enhanced. Thus, tires having a low noise level and an excellent cornering stability are first obtained according to the invention.

Furthermore, according to the invention, the bead portion 3 may be reinforced with a steel wire layer 4 or the like.

The invention has an essential feature that a belt layer using cords of high strength, high modulus polyvinyl alcohol fiber is interposed between tread and steel cord layer. For the belt cord layer interposed between the tread and the steel cord layer, it is considered to use cords composed of high modulus polyester fiber or conventionally known polyvinyl alcohol fiber having a strength of about 8 g/d. However, the modulus of elasticity of cord is insufficient even in the case of the high modulus polyester fiber cord, while the modulus of elasticity of the cord made by twisting the conventionally known polyvinyl alcohol fibers is still low and insufficient. Furthermore, these fibers are largely poor in the fatigue resistance and resistance to wet heat as compared with those of the high strength, high modulus polyvinyl alcohol fiber according to the invention, so that the use of them is unfavorable in the tire performances and durability.

According to the invention, the twisting coefficient $N_T$ and strength S of the high strength, high modulus polyvinyl alcohol fiber cord taken out from the tire are required to satisfy the above equations (1) and (2), which is based on the following facts:

As to the twisting coefficient $N_T$, when it is less than 0.19, the fatigue resistance of the cord is poor and also the adhesion force is poor, and hence there is remaining a fear in the tire durability. On the other hand, when it is more than 0.55, the reduction of the strength due to the twisting becomes larger, so that the merit as a high strength cord is lost by one-half.

As to the strength S, when it does not satisfy the equation (2), the limit cornering property, the steering property handling and the like are undesirably degraded due to the shortage of belt rigidity and the like.

Moreover, the invention can satisfy the equation (2) because there is used the high strength polyvinyl alcohol fiber cord, whose strength S (g/d) is higher by about 50% than that of the conventional polyvinyl alcohol fiber at a raw fiber stage, as a cord.

Further, according to the invention, when the dynamic modulus E' (dyn/cm$^2$) at 100° C. and 30 Hz of the above organic fiber cord taken out from the tire is not less than $0.8 \times 10^{11}$ dyn/cm$^2$, it is easy to avoid the reduction of the cornering stability due to the shortage of the tire rigidity. When it is not more than $2.0 \times 10^{11}$ dyn/cm$^2$, the effect of reducing noise is easily obtained.

Such a high strength, high modulus polyvinyl alcohol fiber is obtained by largely increasing the drawing ratio after the dry.wet spinning as disclosed in U.S. Pat. No. 4,603,083. Since such a high drawing densifies the amorphous structure in the fiber, not only the merit of high strength and high modulus of elasticity is obtained, but also the fatigue resistance of the cord is improved and the resistance to wet heat, which is usually a defect of the polyvinyl alcohol fiber, is largely improved as compared with the conventional case. Therefore, it is considered that the effect of improving the fatigue resistance and resistance to wet heat, which are apprehended in the conventional polyvinyl alcohol fiber, is very large.

According to the invention, it is required to combine a belt layer using the high strength, high modulus polyvinyl alcohol fiber with at least one steel cord layer as a belt. Because, when the fiber cord layer is not combined with the steel cord layer, the belt rigidity is low as compared with that using only the steel cord layer. Hence the cornering stability cannot be ensured and the effect of reducing the noise is not substantially observed. That is, the effect of reducing the noise is first developed by interposing at least one layer made from cords obtained by twisting high strength, high modulus polyvinyl alcohol fibers between the steel cord layer and the tread. Furthermore, according to the invention, it is required that the layer of the high strength, high modulus polyvinyl alcohol fiber cord is interposed at a state of folding its transverse end portions or a so-called fold belt structure state between the steel cord layer and the tread from a viewpoint of the improvement of stability.

Moreover, in the invention an important feature that the relation between the turnup height H (mm) of the carcass ply 1 around the bead portion 3 shown in r FIG. 1 and the tensile stress M (kg/cm$^2$) at room temperature and 50% elongation of rubber reinforcing the bead portion 3 or a so-called bead filler rubber satisfies the above equation (3). This is an inevitable condition in order to compensate for the reduction of tire rigidity when one of at least two steel cord layers in the conventional tire is replaced with a layer of the high strength, high modulus polyvinyl alcohol fiber cord having a modulus of elasticity lower than that of steel cord.

The above equation (3) is an empirical equation based on the results of studies made by the inventors. That is, the inventors have examined the relation between the bead filler rubber and the turnup height H of the carcass ply and clarified from experiments that the tire rigidity can be improved by increasing the tensile stress M at room temperature and 50% elongation of the bead filler rubber or by increasing the turnup height H of the carcass ply around the bead portion and led the equation (3). After tires were prepared by variously changing the tensile stress M of the bead filler rubber and the turnup height H of the carcass ply, a so-called cornering power value (hereinafter referred to as CP value) most reflecting the tire rigidity was measured as compared with that of the steel belt tire, and consequently it has been found that tires having a tire rigidity larger than that of the steel belt tire can be obtained in the region satisfying the equation (3) as shown in FIG. 2. Moreover, when the tensile stress M is less than 25 kg/cm$^2$, not only the decrease of CP value but also the flatting of the bead portion during the running are produced to undesirably degrade the durability, so that the tensile stress is preferable to be not less than 25 kg/cm$^2$. On the other hand, when the turnup height H is not higher than 25 mm, there is a possibility that the carcass ply comes out from the bead portion and there is caused a problem in the tire safety, so that the turnup height H is favorable to be higher than 25 mm.

The invention will be described with reference to the following Examples and Comparative Examples.

In these examples, fibers having strength and elongation shown in the following Table 1 as measured by the following methods were used as a belt cord, whereby a radial tire of 165 SR 13 using one carcass ply of polyester fiber cord with a cord structure of 1500 d/2 and 40×40 T/10 cm was prepared.

TABLE 1

| | | High strength, high modulus polyvinyl alcohol fiber | Conventional vinylon fiber |
|---|---|---|---|
| Raw fiber | strength (g/d) | 17.5 | 11.0 |
| | elongation under a load of 4.5 g/d (%) | 1.8 | 3.0 |
| | specific gravity | 1.30 | 1.28 |
| | retention of strength in steam of 130° C. (%) | 90 | 40 |
| Cord | construction | 1,500 d/2 32 × 32 | 1,800 d/2 30 × 30 |
| | fatigue* index | 1,000 | 100 |
| Properties of cord taken out from tire | tenacity (kg/cord) | 40.5 | 30 |
| | strength (g/d) | 13.5 | 8.3 |
| | elongation under a load of 2.25 g/d (%) | 1.8 | 3.0 |

*A time until the tube is broken at a bending angle of 80° is measured by means of a GY type tube fatigue testing machine, which is represented by an index on the basis that the conventional vinylon fiber is 100. The larger the index value, the better the fatigue resistance of cord.

Moreover, the high strength, high modulus polyvinyl alcohol fibers used in Examples not only have the strength and modulus of elasticity higher than those of the conventional vinylon fiber, but also largely improve the fatigue resistance and the like based on the densification of amorphous portion, so that the degradations of fatigue resistance, which is apprehended in the conventional vinylon cord, the cord strength at high wet heat temperature and the adhesion property can effectively be prevented.

Furthermore, the belt layer of the organic fiber cord used in Examples and Comparative Examples was produced as follows. At first, the raw fiber was subjected to ply twisting and cable twisting to enhance the bundling property of cord. According to circumstances, the thus obtained cords were woven with a warp yarn to form a tire cord fabric. Alternatively, the twisted cords were dipped into an ordinary dipping solution for tire cord such as resorcin-formaldehyde-latex or the like as they were and then subjected to a heat treatment. In Examples, a so-called RF/L solution having the following composition was used as the dipping solution.

| Solution A | |
|---|---|
| (1) resorcin | 18.2 (parts by weight) |
| (2) formalin (37%) | 26.9 |
| (3) NaOH (10% aqueous solution) | 6.6 |
| (4) soft water | 220 |
| Solution B | |

| -continued | |
|---|---|
| (1) vinylpyridine-styrene-butadiene terpolymer latex (41%) | 250.2 |
| (2) styrene-butadiene copolymer latex (40%) | 141.7 |
| (3) soft water | 336.4 |

The solution A was aged at 25° C. for 8 hours and mixed with the solution B while stirring, which was then aged at 25° C. for 8 hours to form a dipping solution. In addition, the dipping solution may be prepared by aging a solution having the following composition at 25° C. for 8 hours:

| (1) resorcin | 18.2 |
|---|---|
| (2) formalin (37%) | 26.9 |
| (3) NaOH (10% aqueous solution) | 6.6 |
| (4) vinylpyridine-styrene-butadiene terpolymer latex (41%) | 351.3 |
| (5) soft water | 597.0 |

The latter dipping solution has no problem in the practical use though the adhesion force somewhat decreases. In other words, there is fundamentally no problem even when using the RF/L dipping solution usually used in the tire industry because the polyvinyl alcohol fibers naturally have a hydroxy group (—OH) and can develop sufficient adhesion force without using a special dipping solution.

After dipping into the above dipping solution, the cord is subjected to drying and heat treatments under tension. In Examples, such treatments were carried out under the following conditions. That is, the cord was dried at 130° C. under a tension of 0.1 g/d for 200 seconds and continuously heat treated at 200° C. under a tension of 1 g/d for 40 seconds without winding and further heat treated at 200° C. under a tension of 0.5 g/d for 40 seconds to prepare a so-called dip cord. Although the heat treatment under tension is not limited to the above case, the tension at the drying step is favorable to be not more than 0.15 g/d because when the tension at the drying step is more than 0.15 g/d, the strength of the dip cord tends to lower.

The thus obtained tire cord fabric or the like was coated with rubber, which was then used in each of the radial tires as a rubberized belt material to be used in the usual tire building.

The measurements of cord strength and elongation as well as test methods of the tire will be described below.
(1) Strength and elongation The strength at breakage (g/d) and elongation (%) under a loading of 2.25 g/d or 4.5 g/d were measured when the cord was pulled at a temperature of 25°±2° C. by means of an autograph according to a method of JIS L1017. Moreover, the denier number used a denier of a raw fiber before the twisting, because it was required to avoid the complicated change of denier due to the change of cord length based on the twisting, dipping and shrinking in vulcanization. In case of measuring the cord taken out from the tire, a cord of about 40 cm in length was taken out from the tire around its crown center portion without damage and the coating rubber was removed from the cord as far as possible, and thereafter the strength and elongation were measured at a sample length of 25 cm.
(2) Measurement of noise The level of noise dB (A) was evaluated with respect to control tire by using an average value of outdoor noise and indoor noise.

(i) Outdoor noise

The test on a drum for tire was carried out according to JASO (Jidosha Gijutsu Kai) C 606-81, an outline of which is shown below.

In this test, a tester was used to be provided with a drum of 3 m in diameter, whose surface being flat and containing coarse face of high friction coefficient, as a substitute road surface and a loading device for tire. This tester was subjected to a sound proof treatment invasion to prevent invention of noise from outside as far as possible, and the loading and internal pressure for the tire were a maximum load defined according to JIS D4202 and an air pressure corresponding thereto. The rim used was a standard rim defined according to JIS D4202.

After a microphone was placed at a position separated away by 1 m from the tire, the tire was trained at 60 km/hr for 30 minutes. Then, the internal pressure and load were again adjusted, and noise level [dB(A)] was measured at a speed of 30 km/hr ~ 110 km/hr, from which an average noise level [dB(A)] over the whole speed range was calculated.

(ii) Indoor noise

After four tires used in the invention and having a tire size of 165 SR 13 and a 5J 13 rim were mounted on an ordinary passenger car of 1,500 cc, they were run on an asphalt paved rough straight road at a speed of 40 km/hr, 60 km/hr, 80 km/hr or 100 km/hr under an internal pressure of 1.9 kg/cm², during which indoor noise was measured by means of a microphone fixed at a position shifted by 15 cm from the center of the front and rear seats toward a window side the driver's seat and at a height of 70 cm from the seat surface. In this case, noise level dB(A) of 25 ~ 4,000 Hz was measured at each speed, from which an average noise level dB(A) over a whole speed range was calculated.

(3) Cornering stability

The test tire subjected to an internal pressure of 1.70 kg/cm² was placed on a drum of 2,500 mm in an outer diameter and trained at a speed of 30 km/hr under a loading of 395 kg for 30 minutes. After the internal pressure was readjusted to 1.70 kg/cm² under no load, the tire was run on the drum at the same speed under a loading of 390 kg while being continuously subjected to positive and negative slip angles of 15° at maximum, during which the cornering force (CF) at such positive and negative angles was measured, from which the cornering power (CP value) was calculated by the following equation:

$$CP_{(kg/degree)} = \frac{CF(1°)(kg) + CF(2°)(kg)/2 + CF(3°)(kg)/3 + CF(4°)(kg)/4}{4°}$$

Moreover, the CP value of each test tire was represented by an index on the basis that the control tire was 100. The larger the index value, the better the cornering stability.

(4) Turnup height H of carcass ply

A sample was cut out from the tire in radial direction, from which was measured a vertical length H extending from the turnup end of the carcass ply 1 to the bead base as shown in FIG. 1.

(5) Dynamic modulus

The organic fiber cord taken out from the crown center of the vulcanized tire was heated from room temperature at a temperature rising rate of 3° C./min under an initial tension of 1.5 g/cord and a dynamic tension of 500 g/cord, during which the dynamic modulus E' at each temperature was measured by means of a spectrometer made by Iwamoto Seisakusho. In this case, the initial sample length was 2.5 cm. The cord diameter was determined by completely removing rubber from the rubberized cord taken out from the tire and measuring the diameter with a dialgauge, from which a cord sectional area was calculated.

COMPARATIVE EXAMPLE 1

The tire to be tested had a belt of separate lamination structure that a first cord layer located near the carcass was separated from a second cord layer superimposed thereon so as to cross the cords of these layers with each other and the cord angle in the first and second layers was 15° with respect to the circumferential direction of the tire. As the cord in the first and second belt layers, there was used a steel cord of 1×5 construction having a filament diameter of 0.68 mm and a strength of 65 kg/cord. In the first and second belt layers, such steel cords were embedded in rubber at an end count of 38 cords/5 cm. Furthermore, a bead filler rubber having a tensile stress M at 50% elongation of 32 kg/cm² was arranged in the bead portion and the turnup height H of the carcass ply was 25 mm. The thus obtained steel belt tire (165 SR 13) was used as a control tire.

EXAMPLE 1 AND 2, COMPARATIVE EXAMPLES 2~5

In these examples, the same steel cord having a 1×5 construction and a filament diameter of 0.68 mm as in Comparative Example 1 was used in the first belt layer, while cords of high strength, high modulus polyvinyl alcohol fiber were used at an end count of 40 cords/5 cm in the second belt layer.

Moreover, the second belt layer had a folded belt structure having a fold width of 25 mm, while the turnup height H of the carcass ply was 25 mm. On the other hand, the bead filler rubber had a tensile stress M at 50% elongation as shown in Table 2. In Examples 1 and 2 and Comparative Example 5, the bead filler had a composite structure consisting of rubber A having a high tensile stress M and rubber B having a low tensile stress M as shown in FIG. 1. Since the hardness of the bead filler could optionally be changed by properly combining the hard rubber A with the soft rubber B, a bead filler rubber corresponding to rubber having a tensile stress M of 50 kg/cm² was obtained, for example, by combining equal amounts of two rubbers having tensile stresses M of 40 kg/cm² and 60 kg/cm². For reference, the average tensile stress M in combination of two rubbers was 50 kg/cm² in Example 1, 36 kg/cm² in Comparative Example 5, and 44 kg/cm² in Example 2.

The aforementioned tests were made with respect to these tires having the above belt structure and bead portion structure to obtain results as shown in Table 2.

As seen from Table 2, the tire rigidity in Comparative Examples 2~5 is lower than that of the control tire and also the CP values are poor. In Examples 1 and 2, however, the tire rigidity is higher than that of the control tire by increasing the tensile stress at 50% elongation of the bead filler to more than the predetermined value.

Moreover, the reduction of noise was achieved in these Examples and Comparative Examples because the cord of the high strength, high modulus polyvinyl alcohol fiber was used in the second belt layer.

COMPARATIVE EXAMPLES 6 AND 7, EXAMPLES 3 AND 4

The belt had the same structure as in Example 1 and the turnup height H of the carcass ply was 40 mm, and the bead filler rubber had a tensile stress M at 50% elongation as shown in Table 2.

The same tests as mentioned above were made with respect to these tires having the above belt structure and bead portion structure to obtain results as shown in Table 2.

As seen from Table 2, the CP value of Comparative Examples 6 and 7 using relatively flexible bead filler rubber with a tensile stress M of 20 or 32 kg/cm² is lower than or equal to that of the control tire, while the cornering stability in Examples 3 and 4 is higher than that of the control tire because the tensile stress M is higher than the predetermined value.

Moreover, the effect of reducing noise was observed in all examples likewise Example 1.

COMPARATIVE EXAMPLE 8, EXAMPLES 5~9

The belt had the same structure as in Example 1 and the turnup height H of the carcass ply was 70 mm, and the bead filler rubber had a tensile stress M at 50% elongation as shown in Table 2. In Examples 7 and 8, the bead filler was formed by combining two rubbers having M's of 32 and 60 kg/cm². In Example 9, a wire insert layer was arranged between the turnup portion of the carcass ply and the bead filler rubber as shown by numeral 4 in FIG. 1.

The same tests as previously mentioned were made with respect to these tires having the above belt structure and bead portion structure to obtain results as shown in Table 2.

As seen from Table 2, the cornering stability in Examples 5~9 is improved as compared with the control tire because the tensile stress M of the bead filler rubber is larger than that of Comparative Example 8. In Example 9, the wire insert layer is particularly arranged between the turnup portion and the bead filler rubber, so that the rigidity of the bead portion is largely increased and the CP value becomes considerably large. Moreover, the effect of reducing noise was observed in all examples.

COMPARATIVE EXAMPLE 9

As the belt structure, the same steel cords having a 1×5 construction and a filament diameter of 0.68 mm as in Comparative Example 1 were used in the first belt layer, while cords of aramid fiber were used at an end count of 40 cords/5 cm in the second belt layer. Moreover, the second belt layer had a fold structure having a fold width of 25 mm, and the turnup height H of the carcass ply was 25 mm, and the tensile stress M at 50% elongation of the bead filler rubber was 20 kg/cm². The aforementioned tests were made with respect to the tire having the same belt structure and bead portion structure as in Comparative Example 2 except the use of aramid fiber cord to obtain results as shown in Table 2.

As seen from Table 2, the tire of Comparative Example 9 has a CP value larger than that of the tire of Comparative Example 2, but there is observed no reduction of noise because of the aramid fold structure.

TABLE 2(a)

|  |  | Comparative Example 1 (control) | Comparative Example 2 | Comparative Example 3 | Comparative Example 4 | Example 1 | Comparative Example 5 |
|---|---|---|---|---|---|---|---|
| Belt Structure |  |  |  |  |  |  |  |
| organic fiber cord layer |  | — |  |  |  |  |  |
| ——— steel cord layer |  |  |  |  |  |  |  |
| Belt material |  | steel cord | high strength, high modulus polyvinyl alcohol fiber cord + steel cord | | | | |
| Properties of organic fiber cord taken out from tire | cord structure | — | 1,500 d/2 30 × 30 | | | | |
|  | twisting coefficient $N_T$ | — | 0.38 | 0.38 | 0.38 | 0.38 | 0.38 |
|  | cord tenacity (kg) | — | 40.5 | 40.5 | 40.5 | 40.5 | 40.5 |
|  | strength S (g/d) | — | 13.5 | 13.5 | 13.5 | 13.5 | 13.5 |
|  | E' (dyn/cm²) | — | $1.3 \times 10^{11}$ | $1.3 \times 10^{11}$ | $1.3 \times 10^{11}$ | $1.3 \times 10^{11}$ | $1.3 \times 10^{11}$ |
| 125-2.5 M |  | — | 75 | 50 | 25 | 0 | 35 |
| Turnup height of carcass ply (mm) |  | 25 | 25 | 25 | 25 | 25 | 25 |
| Tensile stress at 50% elongation of bead filler rubber M (kg/cm²) |  | 32 | 20 | 32 | 40 | A40 50% B60 50% average 50 | A20 60% B60 40% average 36 |
| Cornering power index (CP value) |  | 100 | 93 | 97 | 100 | 103 | 98 |
| Noise level dB/(A) |  | 0 | −2.2 | −2.2 | −2.2 | −2.4 | −2.1 |

TABLE 2(b)

|  |  | Example 2 | Comparative Example 6 | Comparative Example 7 | Example 3 | Example 4 | Comparative Example 8 |
|---|---|---|---|---|---|---|---|
| Belt Structure |  |  |  |  |  |  |  |
| organic fiber cord layer |  |  |  |  |  |  |  |
| ——— steel cord layer |  |  |  |  |  |  |  |
| Belt material |  | high strength, high modulus polyvinyl alcohol fiber cord + steel cord | | | | | |
| Properties of organic fiber cord taken out from tire | cord structure | 1,500 d/2 30 × 30 | | | | | |
|  | twisting coefficient $N_T$ | 0.38 | 0.38 | 0.38 | 0.38 | 0.38 | 0.38 |
|  | cord tenacity (kg) | 40.5 | 40.5 | 40.5 | 40.5 | 40.5 | 40.5 |
|  | strength S (g/d) | 13.5 | 13.5 | 13.5 | 13.5 | 13.5 | 13.5 |

TABLE 2(b)-continued

|  | Example 2 | Comparative Example 6 | Comparative Example 7 | Example 3 | Example 4 | Comparative Example 8 |
|---|---|---|---|---|---|---|
| E' (dyn/cm$^2$) | 1.3 × 10$^{11}$ | 1.3 × 10$^{11}$ | 1.3 × 10$^{11}$ | 1.3 × 10$^{11}$ | 1.3 × 10$^{11}$ | 1.3 × 10$^{11}$ |
| 125-2.5 M | 15 | 75 | 50 | 25 | −25 | 75 |
| Turnup height of carcass ply (mm) | 25 | 40 | 40 | 40 | 40 | 70 |
| Tensile stress at 50% elongation of bead filler rubber M (kg/cm$^2$) | A40 40% B60 60% average 44 | 20 | 32 | 40 | 60 | 20 |
| Cornering power index (CP value) | 102 | 96 | 100 | 103 | 110 | 99 |
| Noise level dB/(A) | −2.3 | −2.3 | −2.2 | −2.2 | −2.3 | −2.2 |

TABLE 2(c)

|  |  | Example 5 | Example 6 | Example 7 | Example 8 | Example 9 | Comparative Example 9 |
|---|---|---|---|---|---|---|---|
| Belt Structure |  |  |  |  |  |  |  |
| ——— organic fiber cord layer |  |  |  |  |  |  |  |
| ——— steel cord layer |  |  |  |  |  |  |  |
| Belt material |  | high strength, high modulus polyvinyl alcohol fiber cord + steel cord |  |  |  |  | aramid + steel cord |
| Properties of organic fiber cord taken out from tire | cord structure |  |  | 1,500 d/2 30 × 30 |  |  |  |
|  | twisting coefficient N$_T$ | 0.38 | 0.38 | 0.38 | 0.38 | 0.38 | 0.38 |
|  | cord tenacity (kg) | 40.5 | 40.5 | 40.5 | 40.5 | 40.5 | 49 |
|  | strength S (g/d) | 13.5 | 13.5 | 13.5 | 13.5 | 13.5 | 16.3 |
|  | E' (dyn/cm$^2$) | 1.3 × 10$^{11}$ | 1.3 × 10$^{11}$ | 1.3 × 10$^{11}$ | 1.3 × 10$^{11}$ | 1.3 × 10$^{11}$ | 2.4 × 10$^{11}$ |
| 125-2.5 M |  | 45 | 25 | −25 | 10 | 10 |  |
| Turnup height of carcass ply (mm) |  | 70 | 70 | 70 | 70 | 70 | 25 |
| Tensile stress at 50% elongation of bead filler rubber M (kg/cm$^2$) |  | 32 | 40 | 60 | A32 50% B60 50% average 46 | A32 50% B60 50% average 46 | 20 |
| Cornering power index (CP value) |  | 102 | 105 | 113 | 107 | 112 | 97 |
| Noise level dB/(A) |  | −2.4 | −2.3 | −2.3 | −2.3 | −2.2 | 0 |

As mentioned above, according to the invention, the tire rigidity can be largely increased and also the total cornering stability can be more improved with holding the advantages of the low noise tire.

What is claimed is:

1. A pneumatic radial tire having a belt structure of at least two belt layers composed of at least one layer containing cords each obtained by twisting organic fibers and at least one layer containing steel cords, at least one of the organic fiber cord layers being interposed between the steel cord layer and a tread at a state that both transversely outermost end portions are folded inward, said organic fiber cord having a dynamic modulus at 100° C. and 30H$_2$ of $0.8 \times 10^{11}$ to $2.0 \times 10^{11}$ dyn/cm$^2$ and obtained by twisting high strength, high modulus polyvinyl alcohol fibers and having, after removal from the tire, a twisting coefficent N$_T$ represented by the following equation:

$$N_T = N \times \sqrt{0.139 \times D/p} \times 10^{-3},$$

wherein N is a twisting number per 10 cm of cord length, D is ½ of total denier number of cord and p is a specific gravity of cord and a strength S (g/d), which satisfy the following relations:

$$0.19 < N_T < 0.55 \quad (1)$$

$$S > 15.5 - 12N_T \quad (2,)$$

and said tire satisfying the following relation:

$$H > 2.5M + 125 \quad (3),$$

wherein H is a height of a turnup portion of a carcass ply around a bead portion (mm) and M is tensile stress at 50% elongation of a bead filler rubber reinforcing the bead portion at room temperature (kg/cm$^2$).

2. The pneumatic radial tire according to claim 1, wherein said tensile stress M is not less than 25 kg/cm$^2$.

3. The pneumatic radial tire according to claim 1, wherein said height of the turnup portion is higher than 25 mm.

4. The pneumatic radial tire according to claim 1, wherein said bead portion disposed between said carcass and said turn-up is further reinforced with a steel wire layer between said turnup portion and a said bead filler rubber.

* * * * *